United States Patent
Yashiki

[11] Patent Number: 5,278,822
[45] Date of Patent: Jan. 11, 1994

[54] COMMUNICATION CONTROL METHOD FOR ISDN, AND DATA TERMINAL ADAPTOR APPARATUS FOR SAME

[75] Inventor: Satoshi Yashiki, Hiratsuka, Japan

[73] Assignee: Matsushita Graphic Communication Systems, Inc., Tokyo, Japan

[21] Appl. No.: 853,193

[22] Filed: Mar. 18, 1992

[30] Foreign Application Priority Data

Mar. 20, 1991 [JP] Japan .................................. 3-056607

[51] Int. Cl.$^5$ ............................................. H04J 3/14
[52] U.S. Cl. ...................... 370/13; 370/79; 340/825.06; 371/62
[58] Field of Search ....................... 370/13, 14, 15, 16, 370/79, 85.1, 85.8, 85.13, 110.1; 371/15.1, 16.5, 29.1, 61, 62; 379/93, 94; 340/825.06, 825.16, 825.17

[56] References Cited

U.S. PATENT DOCUMENTS

| | | |
|---|---|---|
| 4,858,222 | 8/1989 | Weimert et al. ...................... 370/13 |
| 4,965,795 | 10/1990 | Coffelt et al. ......................... 370/13 |
| 4,975,900 | 12/1990 | Murata et al. ..................... 370/110.1 |
| 4,989,202 | 1/1991 | Soto et al. ............................ 370/13 |
| 5,079,765 | 1/1992 | Nakamura ......................... 370/85.1 |
| 5,134,611 | 7/1992 | Steinka et al. .................... 370/110.1 |
| 5,142,525 | 8/1992 | Nakatsuma ........................... 370/13 |

Primary Examiner—Benedict V. Safourek
Assistant Examiner—Alpus H. Hsu
Attorney, Agent, or Firm—Lowe, Price, LeBlanc & Becker

[57] ABSTRACT

A terminal adapter unit for use in a wide-band network based on an ISDN is connected in the data path between a data terminal and the ISDN, and functions to control accessing and releasing a line through the ISDN to an opposite data terminal, in accordance with whether or not data are actually being transferred between the terminals. Unnecessary line utilization costs can thereby be reduced since lengthy intervals in which the terminals are accessing the ISDN while the data transfer is interrupted, due to a data terminal failure or operating error, can be eliminated.

15 Claims, 13 Drawing Sheets

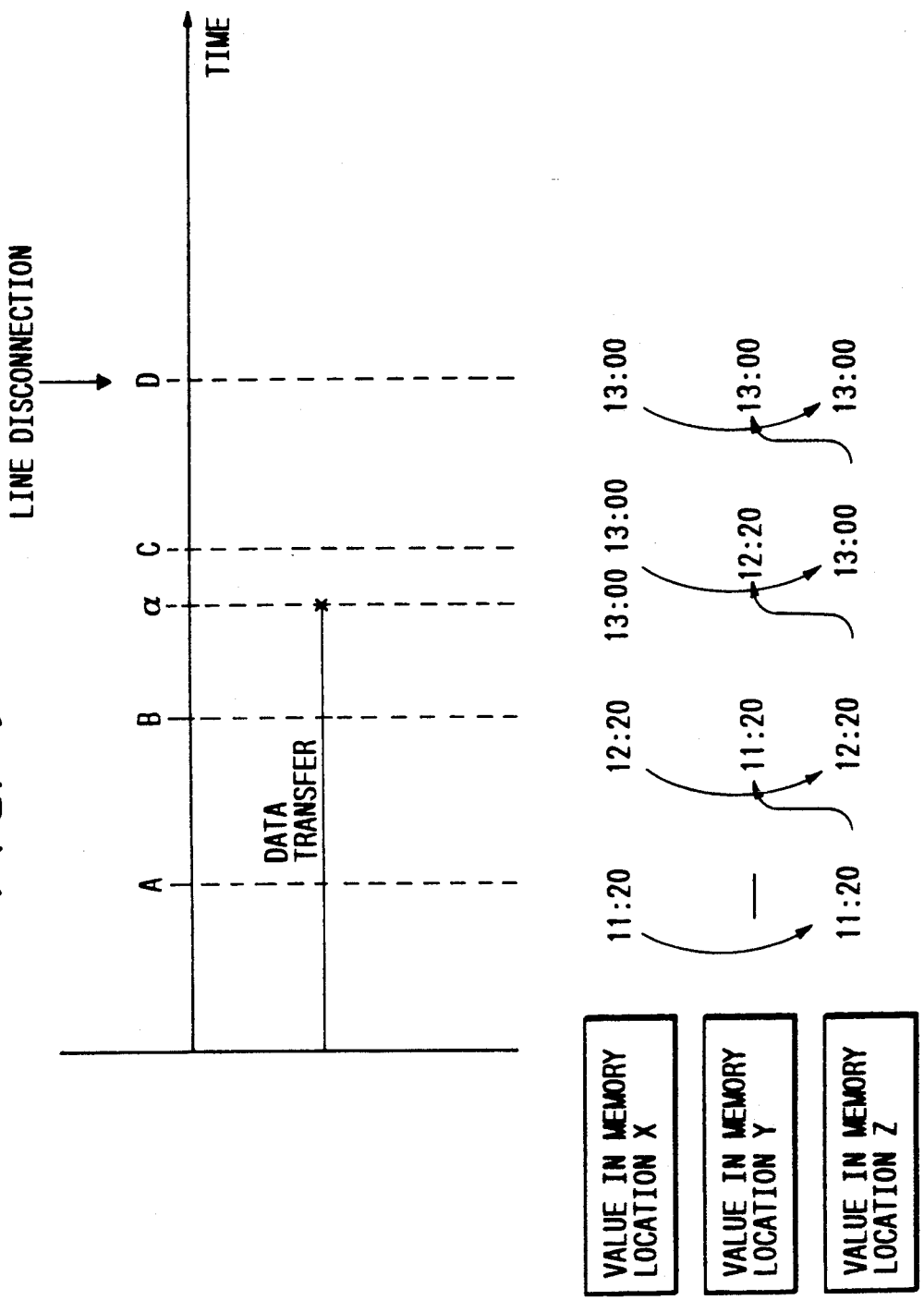

COMMUNICATION CONTROL METHOD FOR ISDN, AND DATA TERMINAL ADAPTOR APPARATUS FOR SAME

BACKGROUND OF THE INVENTION

1. Field of the Invention

The present invention relates to a wide-area network system for data communication, based on an ISDN (Integrated Service Digital Network), and in particular to a communication control method for use with an ISDN and a data terminal adaptor apparatus for implementing that method, whereby a substantial reduction can be achieved in unnecessary line utilization costs for the users of such a network system.

2. Description of the Related Art

FIG. 1 illustrates the general configuration of a prior art type of network system based on an ISDN. In FIG. 1, numeral 2 denotes a line of an ISDN 1, 3 denotes a data switching unit (DSU) which is connected to the line 2, 4 denotes a gateway unit which is connected to the line terminating unit 3, for changing the communication protocol, 6 denotes respective data terminals, 7 denotes a host computer, and 8 denotes respective ones of a plurality of user terminals which are connected to the host computer 7, and which can be operated by respective users to generate or display data that are to be sent or are received. The data terminal 6, the host computer 7 and the gateway unit 4 are interconnected as shown, for example by an RSC-232C interface.

The set of units 3, 4, 6, 7 8 shown in FIG. 1 will be referred to in the following as a local system. The overall wide area data network system consists of a number of such local systems which can communicate through the ISDN. That is to say, if a data terminal 6 is available in the local system of FIG. 1, a user of a user terminal 8 can transfer data to/from another user terminal within another local system that is connected to the ISDN 1, via the ISDN 1. In that case, the data terminal 6 to which the user terminal is linked by the host computer 7 will initiate accessing of a line 2 of the ISDN 1. Specifically, that data terminal 6 (which is the calling data terminal) is first supplied with necessary information specifying the user terminal which is to be called (i.e. is supplied with, and thereafter holds, the dialling number of the desired opposite user terminal). That data terminal 6 then becomes connected to the line 2 through the gateway unit 4 and DSU 5, and calls the opposite user terminal. As a result, at the other end of the line 2 the called data terminal will also become connected to that line 2, and data transfer between the two user terminals can then begin. When data transfer has been completed, the line 2 will be released, i.e. the calling data terminal 6 will initiate disconnection from the line 2, whereupon the called data terminal will also disconnect from the line 2.

With such a system, accessing and releasing of a communication channel through the ISDN are executed at the data terminals themselves.

However with such a prior art system, the problem arises that unnecessary line utilization costs will arise for the users. Specifically, due to the fact that accessing and releasing the communication channel is performed by the data terminals themselves, if a fault condition arises after a calling data terminal has accessed an ISDN communication channel (so that transfer of data between that terminal and the data terminal at the other end of the communication channel has become halted), the two data terminals will remain in a condition of accessing the ISDN communication channel, and the cost of the time for which the data terminal calling accesses the ISDN in such a condition must of course be paid by the user of the data terminal, even though no data are actually being transferred. Substantial amounts of wasteful line utilization costs may therefore occur. The same problem will occur if there is an error by the user in executing the operating procedure for a data terminal, i.e. the user of a data terminal may have to pay for line utilization costs which were incurred during periods in which no data transfer actually occurred. As data processing functions become increasingly complex and higher in level, and as the systems which are connected to the respective gateway units of an ISDN become increasingly complex, the operating procedures for executing data communication through the data terminals will accordingly become more difficult. Hence, there is an increasing probability that errors in executing the operating procedures will occur, so that there is an increased danger of unnecessary line utilization costs being incurred by the users of such a network system.

Moreover, when an ISDN communication channel has been accessed by a data terminal, and is subsequently left in the accessed condition although data communication is not actually being executed (e.g. due to some equipment failure having occurred or due to an error by the user in executing the operating procedure), in addition to the above problem of wasteful line utilization costs arising, the problem also arises that the data terminal for which such a condition occurs is no longer available for use by other users for communication through the ISDN.

SUMMARY OF THE INVENTION

It is an objective of the present invention to overcome the problem of the prior art as set out above, above, by providing a method of data communication using an ISDN-based wide-area network system which can eliminate the occurrence of a condition in which a terminal continues to access the ISDN for a long period of time after a failure of the data terminal or an error in the operating procedure has occurred so that normal transfer of data through that data terminal cannot occur. Unnecessary ISDN line utilization costs for the system users can thereby be substantially eliminated.

It is a further objective of the present invention to provide a terminal adapter unit for ISDN data communication applications, for implementing the above-mentioned communication control method. Such an ISDN terminal adapter unit is connected between a data terminal and the ISDN, and functions to control accessing and releasing of a communication channel of the ISDN in accordance with the communication channel utilization status. Thus, unnecessary line utilization costs can be substantially eliminated.

More specifically, according to a first aspect the present invention provides a method of communication control for a wide-band network system based on an ISDN, comprising:

monitoring a transfer of communication data between terminals via a line of the ISDN, to detect intervals of cessation of the data transfer;

determining whether a condition occurs in which an interval of cessation of the data transfer exceeds a limit time interval; and if the condition is detected, disconnecting the terminals from the ISDN line.

According to a second aspect, with such a control method an adapter unit is connected between at least one of the terminals and the ISDN, and wherein the adapter unit executing processing for the monitoring and line disconnection operations.

The limit time interval may be a fixedly predetermined time interval, or a variable time interval whose value is varied in accordance with distance between the terminals.

According to a third aspect, the invention provides a method of communication control for a wide-band network system based on an ISDN, comprising:

monitoring the transfer of communication data between a calling terminal and a called terminal via a line of the ISDN, to detect intervals of cessation of the data transfer, the monitoring being executed by respective an apparatus units connected between the calling terminal and the ISDN and between the called terminal and the ISDN;

determining whether a condition occurs in which an interval of cessation of the data transfer exceeds a limit time interval; and if the condition is detected, disconnecting the terminals from the ISDN line, and sending to the calling terminal and called terminal respective messages for notification of the disconnection.

According to a fourth aspect, the invention provides a method of communication control for a wide-band network system based on an ISDN, comprising:

monitoring the transfer of communication data between a calling terminal and a called terminal via a line of the ISDN, to detect intervals of cessation of the data transfer; determining whether a condition occurs in which an interval of cessation of the data transfer exceeds a limit time interval;

if the condition is detected, disconnecting the terminals from the ISDN line;

if it subsequently becomes possible to resume the data transfer, reconnecting the terminals to the ISDN.

According to a fifth aspect, the invention provides a method of communication control for a wide-band network system based on an ISDN, comprising:

monitoring the transfer of communication data between a calling terminal and a called terminal via a line of the ISDN, to detect intervals of cessation of the data transfer;

determining whether a first condition occurs, in which an interval of cessation of the data transfer exceeds a first limit time interval;

if the first condition is detected, disconnecting the terminals from the ISDN line;

determining whether a second condition occurs, in which the interval of cessation of data transfer exceeds a second limit time interval which is longer than the first limit time interval;

if the data transfer again becomes possible prior to the second condition occurring, reconnecting the terminals to the ISDN line; and if the second condition is detected, sending respective notification messages to the calling terminal and called terminal.

With such a method of communication control, each of the first and second limit time intervals can be a predetermined fixed time interval. Alternatively, at least one of the first and second limit time intervals is made variable, having a value that is calculated in accordance with distance between the terminals.

According to a sixth aspect, the invention provides a terminal adapter apparatus disposed in a communication path between an ISDN and a terminal, the terminal executing data communication via a line of the ISDN while the terminal adapter apparatus is connected to the ISDN, the terminal adapter apparatus comprising:

means for monitoring a status of data transfer between the terminal and the ISDN;

control means responsive to results obtained from the monitoring for detecting a condition in which data transfer between the terminal and the ISDN has been halted for a time interval that exceeds a limit time interval, and for disconnecting the ISDN line from the terminal adapter apparatus when the condition is detected.

According to a seventh aspect, the invention provides a terminal adapter apparatus connected between an ISDN and a calling terminal, the terminal executing data communication with a called terminal via the ISDN while the terminal adapter apparatus is connected to the ISDN, the terminal adapter apparatus comprising:

means for monitoring a status of data transfer between the calling terminal and the ISDN;

first control means responsive to results obtained from the monitoring for detecting a first condition in which data transfer between the calling terminal and the ISDN has ceased for a time interval that exceeds a first limit time interval, and for disconnecting the ISDN from the terminal adapter apparatus when the first condition is detected;

second control means responsive to results obtained from the monitoring for detecting a second condition, in which the data transfer has ceased for a time exceeding a second limit time interval which is longer than the first limit time interval, for reconnecting the terminals to the ISDN if the monitoring results subsequently indicate that data transfer has again becomes possible prior to the second condition occurring, and for sending a notification message to the calling terminal if the second condition occurs.

A second terminal adapter apparatus is provided between the ISDN and the called terminal, which sends a notification message to the called terminal if that second terminal adapter apparatus detects that the second condition described above has occurred.

The present invention thereby can substantially eliminate intervals in which two terminals are connected for data communication to an ISDN for data communication between the terminals, but are in a condition in which data transfer between them is halted, due to equipment failure or an operating error. A significant reduction in line utilization costs can thereby be achieved.

BRIEF DESCRIPTION OF THE DRAWINGS

FIG. 9 is a diagram showing the relationship between data communication operation and time point information;

DESCRIPTION OF PREFERRED EMBODIMENTS

Figure 1:
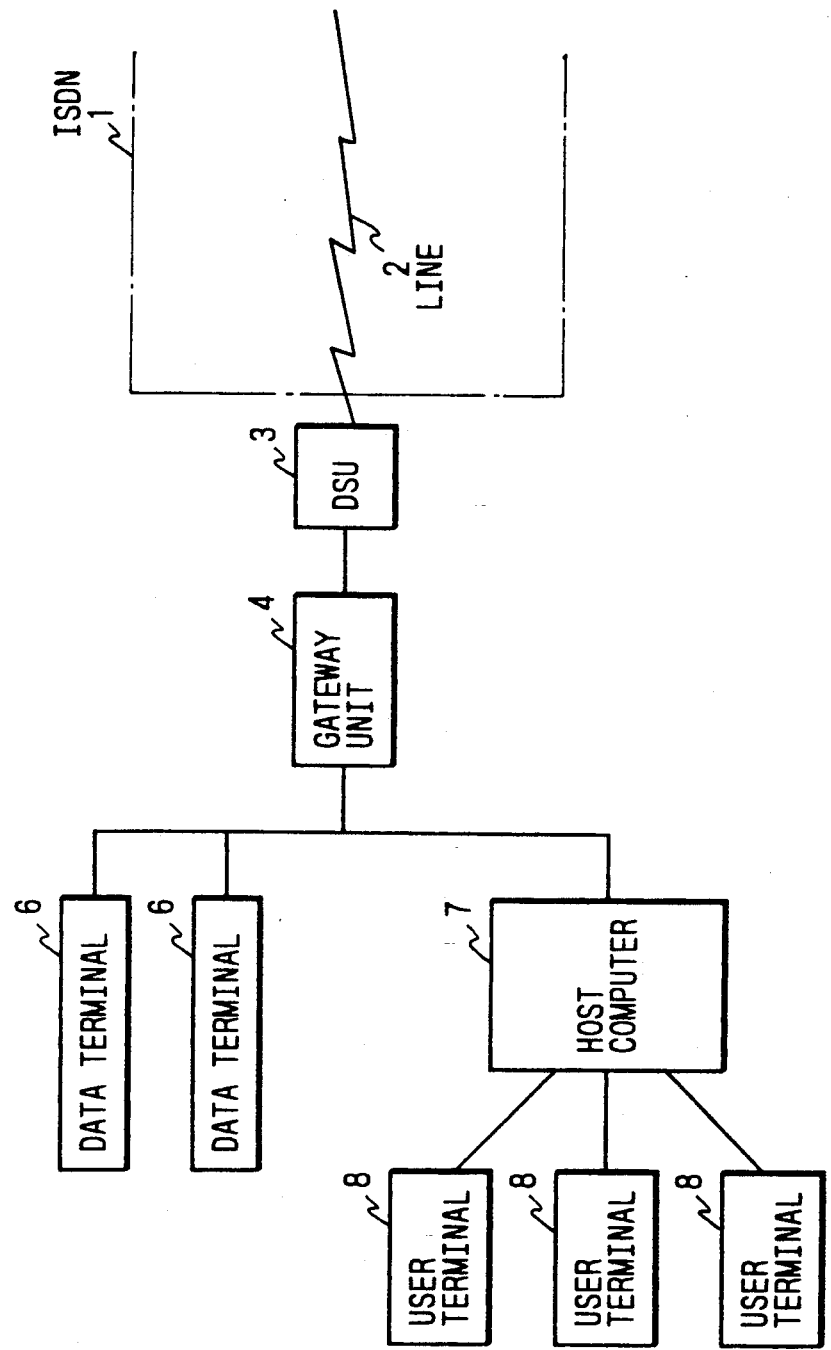
FIG. 1 is a general block diagram of a prior art wide-area network system.
Figure 2:
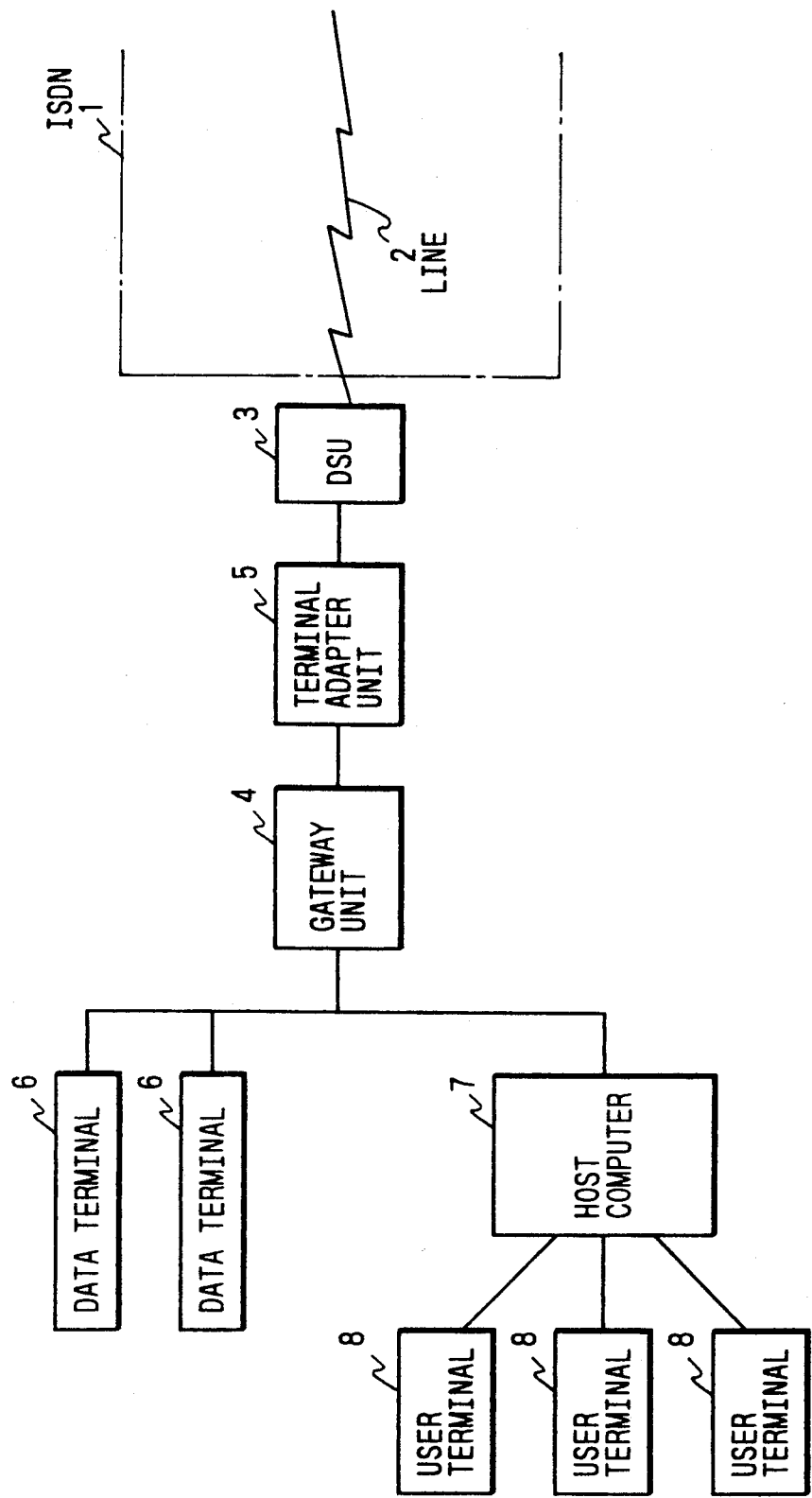
FIG. 2 is a general block diagram of an embodiment of a wide-area network system according to the present invention.
Figure 3:
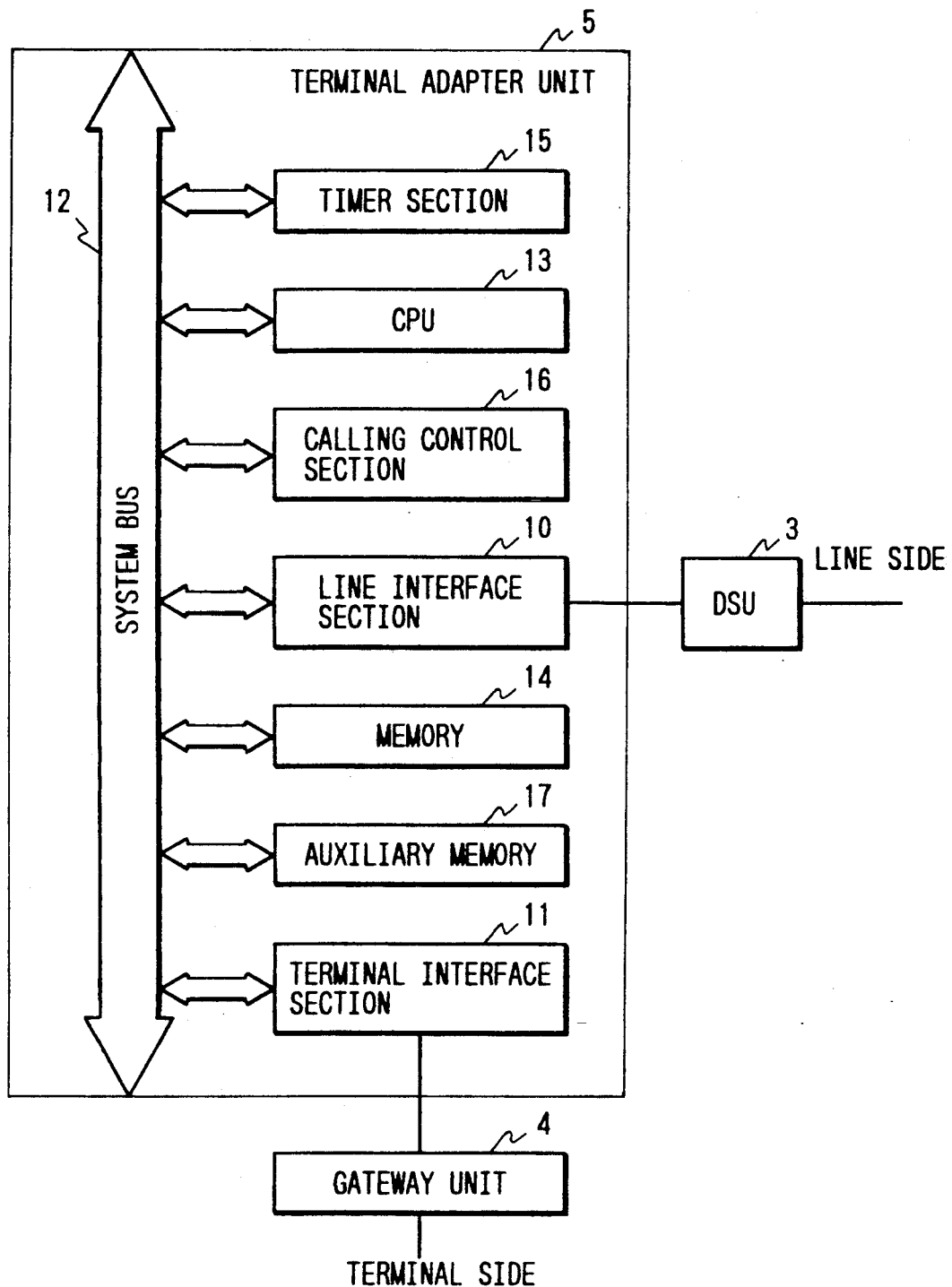
FIG. 3 is a general block diagram showing the internal configuration of the terminal adapter unit.

FIG. 2 shows the general configuration of a network system in accordance with a first embodiment of the present invention. As for the example of FIG. 2, only one local system (out of a plurality of similar local systems which are connected to the ISDN) is shown. In this network system, an ISDN terminal adapter unit 5 is connected between a line terminating unit 3 and a gateway unit 4. In all other respects the configuration of this embodiment is identical to that of the prior art system of FIG. 1. The terminal adapter unit 5 functions to monitor the usage status of the ISDN communication channel, and controls accessing and release of the communication channel. The internal configuration of the terminal adapter unit 5 is shown in general block diagram form in FIG. 3. As shown, this includes a line interface section 10 which is coupled through the line terminating unit 3 to the line 2 of the ISDN 1, and a data terminal interface section 11 at the data terminal side of the terminal adapter unit 5, which is connected through a gateway unit 4 to the data terminals 6. Communication data and various control data flow through a system bus 12, and a CPU 13 executes centralized management and control of the operation of the various sections within the terminal adapter unit 5. The terminal adapter unit 5 also includes a memory 14 which can be accessed by the CPU and other sections, and a timer section 15 which generates time point information. A calling control section 16 monitors the usage status of the ISDN line 2, writes information that is obtained from that monitoring into the memory 14, and controls accessing or release of the communication channel in accordance with results obtained from that monitoring. An auxiliary memory 17 serves to hold management information, etc., which relates to accessing and control of the communication channel.

At least two local systems, each of the form shown in FIG. 2, are connected to the ISDN 1, so that a communication channel can be established through the ISDN 1 between any two of these local systems, for transferring data between respective data terminals of the systems via the ISDN 1. The operation will be described in the following, referring to the drawings. A data terminal 6 which initiates a call from one local system to another through the ISDN 1 will be designated as TS, while the data terminal 6 of the other local system which is called will be designated as TR. Similarly, the terminal adapter unit 5 of the calling system will be designated as AS, while the terminal adapter unit 5 of the called system will be designated as AR.

The basic features of control by the terminal adapter unit 5 are as follows. Two types of control can be selected. The respective sequences of these two types of control are respectively shown in general form in FIGS. 4 and 5. With the first type of control, shown in FIG. 4, when it is found that communication data has ceased to flow over the system bus 12 of the terminal adapter unit 5 of the calling data terminal TS, for a time interval which exceeds a predetermined limit time interval, then the calling terminal adapter unit AS sends a "line disconnect" message to the called data terminal TR, and the physical line is interrupted, i.e. both of the data terminals become disconnected from the line 2 of the ISDN 1. At the same time, the calling terminal adapter unit AS sends a "communication release" message to the calling data terminal TS, to indicate that this data terminal is no longer being used. In response, that data terminal TS disconnects itself from the terminal adapter unit AS, i.e. the sending of that message is equivalent to the terminal adapter unit executing disconnection from that data terminal TS.

The aforementioned limit time interval, beyond which the communication channel is released, can be made either a predetermined fixed time interval or a variable time interval whose value is computed in accordance with the distance between the two data terminals that are to communicate via the ISDN. In the case of the variable time interval, the user specifies beforehand a maximum amount of ISDN line usage cost which will arise for any interval in which a communication channel is established through the ISDN but in which no data transfer is actually taking place (e.g. as a result of terminal equipment failure or operating error). That maximum amount of cost (referred to in the following as the monitoring cost amount), in conjunction with the distance between the two user terminals which are to communicate, will determine the value of the variable limit time interval. For example if the two user terminals are located relatively close together, so that the path through the ISDN is relatively short, then the line usage cost (e.g. per minute) will be relatively low, so that the variable limit time interval can be made relatively long. Specifically, the variable limit time interval value is obtained by dividing the aforementioned monitoring cost amount by the cost (per unit time) of ISDN line usage. That cost per unit time will vary in predetermined increasing steps, as the distance between the two terminals increases.

Figure 4:
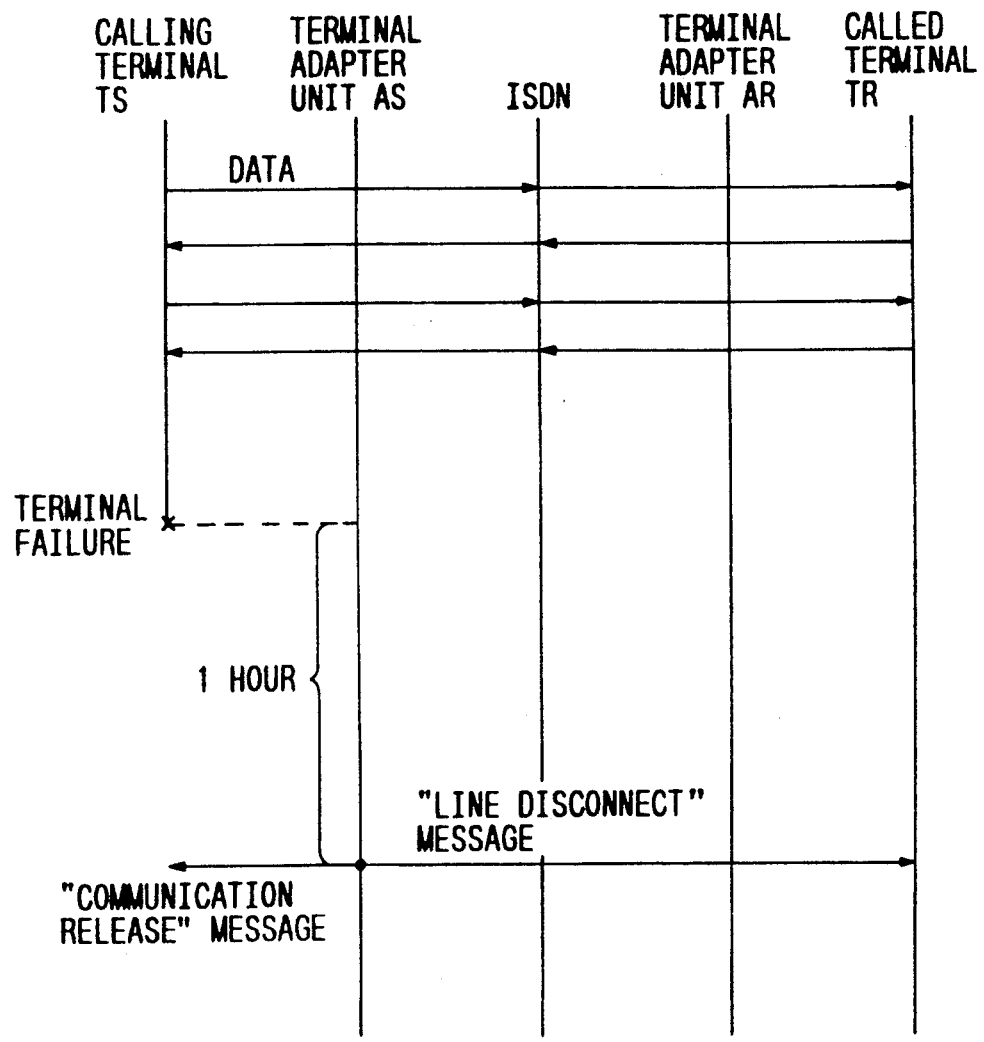
FIG. 4 is a sequence diagram showing an example of a first type of communication channel access and release control operation.

With the first type of control (shown in FIG. 4) either of these two types of limit time interval, fixed or variable, can be selected. In the sequence of FIG. 4, a fixed time interval has been set as the limit time interval. In this case, the communication channel is released when an interval of 1 hour has elapsed since data communication between the two data terminals ceased (e.g. as a result of an equipment failure or an operating error at the calling data terminal TS).

With the second type of control, when a first limit time interval (which is comparatively short) has elapsed after communication data has ceased to flow between the two data terminals via the ISDN, i.e. data has ceased to flow over the system bus 12 of the terminal adapter unit 5 of the calling terminal adapter unit AS, then the calling terminal adapter unit AS sends to the called terminal adapter unit AR a "line disconnect" message, whereby the two data terminals become disconnected from the physical line 2 of the ISDN. However in this case, neither the calling terminal adapter unit AS nor the called terminal adapter unit AR issues a "communication release" message to the respective data terminals TS and TR to which they are respectively connected at that time. That condition can be considered as a state in which a virtual communication line between the two user terminals is held maintained, i.e. a condition in which the calling terminal adapter unit AS is held connected to the calling data terminal TR and also continues to retain the necessary information (i.e. dialling number) for calling the user terminal from which it has been disconnected, while connection is similarly maintained between the called unit AR and the called terminal TR.

Thereafter, if communication data again begins to be sent from the calling data terminal TS, and so is detected as appearing on the system bus 12 of the calling terminal adapter unit AS, the calling terminal adapter unit AS re-connects to the line 2 and calls (i.e. sends a "line access" message to) the called terminal adapter unit AR, which responds by re-establishing connection to the line 2 of the ISDN 1. Thus the two data terminals again become linked through the line 2 of the ISDN 1, and data communication is resumed. In that way, if the comparatively short limit time interval is exceeded after data has ceased to flow between the data terminals, then the physical line interconnection between the two data terminals is interrupted. Thus, a substantial reduction in line utilization costs can be achieved. However since a virtual communication channel is maintained, data transfer between the data terminals two can be rapidly resumed if the physical line through the ISDN is again connected between the two data terminals.

However if that condition of maintaining the virtual communication channel with interruption of the physical line continues for a comparatively long time, so that the second limit time interval is exceeded, then the calling terminal adapter unit AS sends a "communication release" message to the calling data terminal TS, whereby that data terminal becomes disconnected from the terminal adapter unit AS. In addition, the called terminal adapter unit AR (which also detects that the second limit time interval has been exceeded, in the same way as for the calling terminal adapter unit AS) also sends a "communication release" message to the called data terminal TR, and so becomes disconnected from that data terminal. Thus, the virtual communication channel becomes opened, so that both of the data terminals which established that channel now become available to other users.

With the second type of control described above, the first limit time interval is a fixed time interval, while the second limit time interval can be either a predetermined fixed time interval or a variable time interval whose value is calculated, as described hereinabove, in accordance with a predetermined fixed monitoring cost amount and the cost per unit time of communication through the ISDN, with the latter being determined based on the distance between the two data terminals which are to communicate. With this embodiment, either of these two types of time interval can be selected to be the second limit time interval. However it would also be possible to modify that embodiment to make the first limit time interval variable in accordance with the distance between the data terminals that are to communicate.

Figure 5:
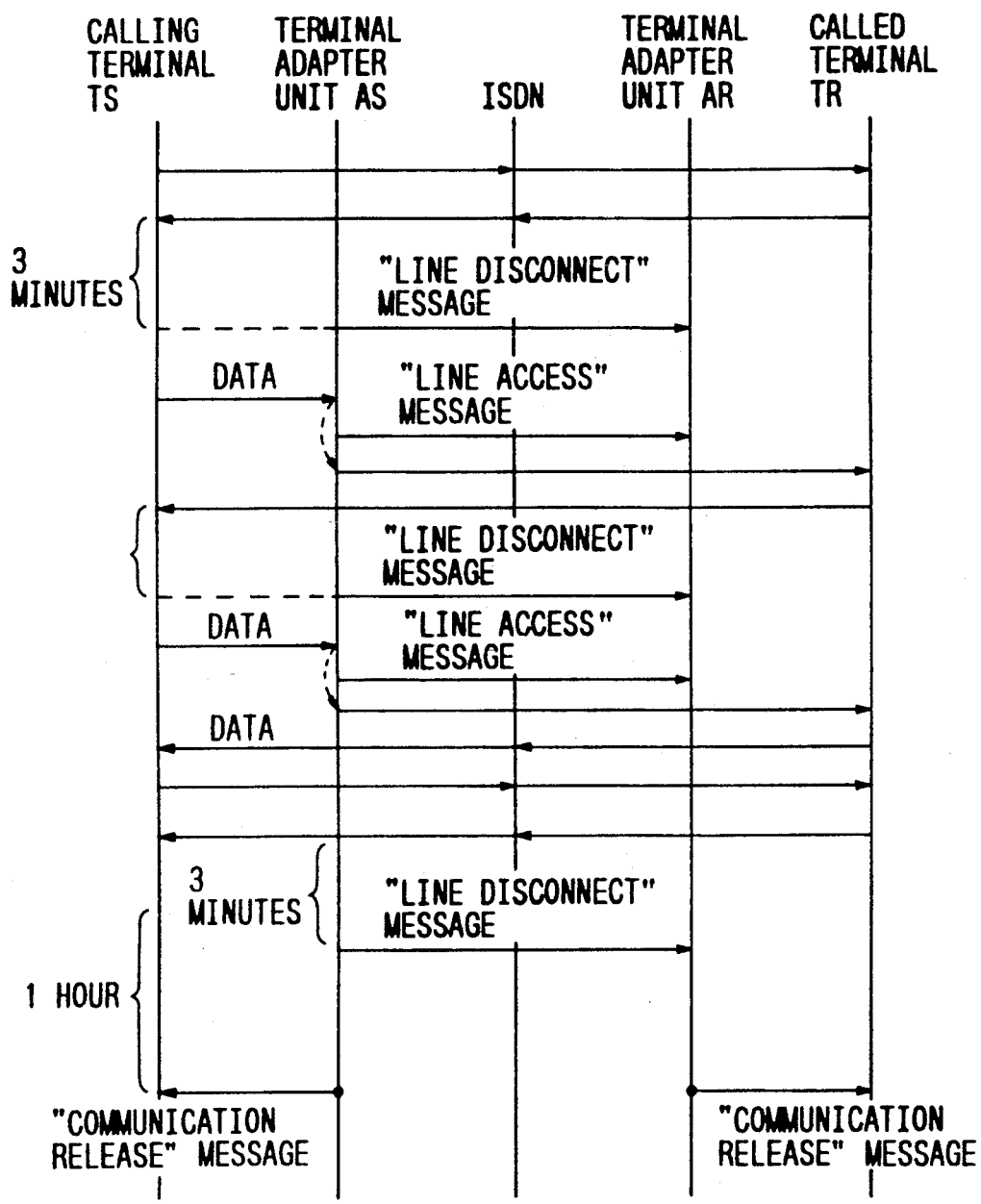
FIG. 5 is a sequence diagram showing an example of a second type of communication channel access and release control operation.

In the sequence example of FIG. 5, the value of the first limit time interval is fixed as 3 minutes, while the second limit time interval is fixed as 1 hour. In this case, if the flow of communication data ceases for more than 3 minutes, then the physical line connection between the two data terminals is interrupted, while the virtual communication line (as described hereinabove) is maintained. If that condition should continue for more than 1 hour, then the virtual communication line is also interrupted, i.e. calling terminal TS disconnects from the terminal adapter unit AS in response to a "communication release" message sent from the terminal adapter unit AS, as described hereinabove, while the called terminal TR similarly disconnects from its terminal adapter unit TR, as shown in FIG. 5.

Figure 6:
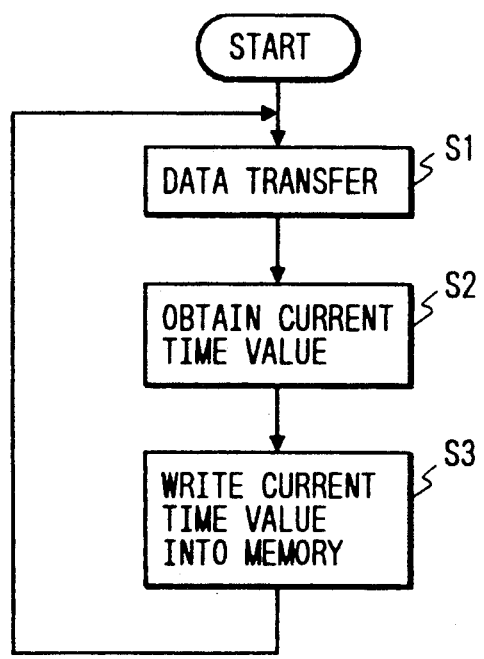
FIG. 6 is a flow chart for describing the operation of a terminal adapter unit.

FIG. 6 is a flow chart for describing the data transfer monitoring operation executed by a terminal adapter unit 5, Step S1 represents detection by the adapter unit of a data transfer via the system bus 12 (step S1). Each time such a data transfer over the system bus 12 occurs, the CPU 13 obtains the current time value from the timer section 15 (step S2), then that time point value is written into a specific location X in the memory 14 (step S3). Operation then returns to step S1. The type of control shown in FIG. 6 is executed for both of the aforementioned first and the second types of control.

Figure 7:
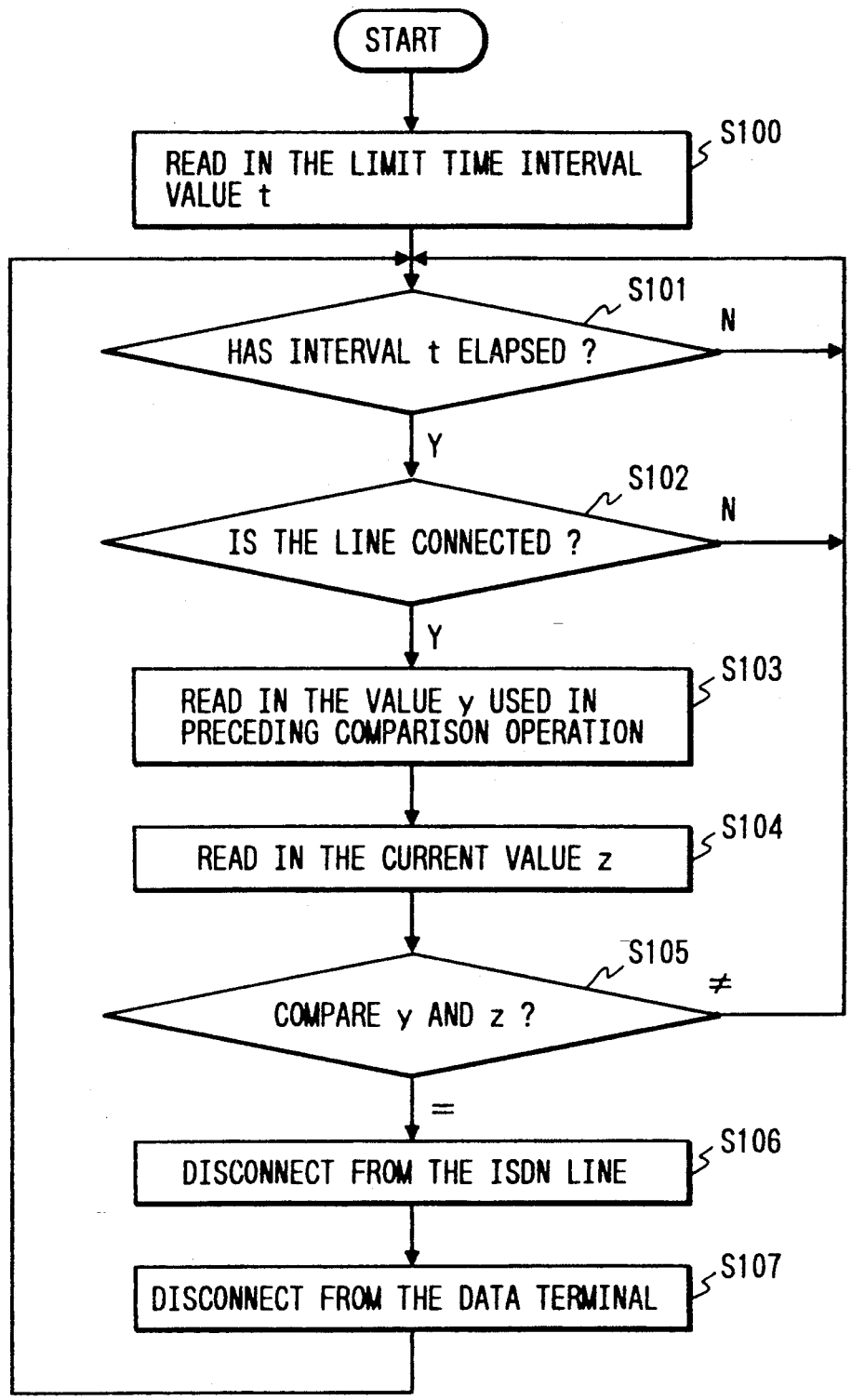
FIG. 7 is a flow chart for describing the operation of a terminal adapter unit for implementing the first type of communication channel access and release control, with a fixed value of limit time interval being used.
Figure 8:
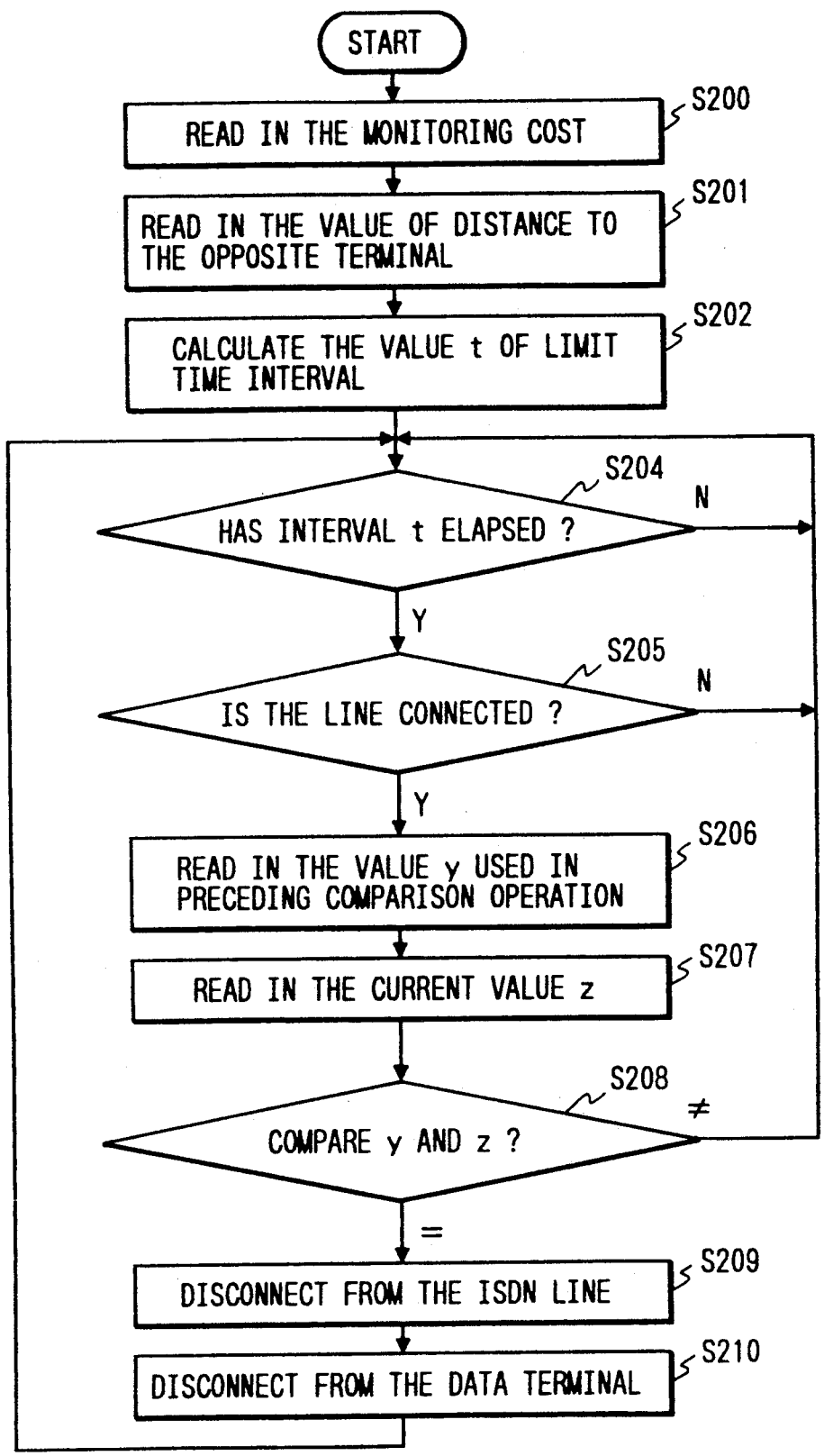
FIG. 8 is a flow chart for describing the operation of a terminal adapter unit for implementing the first type of communication channel access and release control, with a variable value of limit time interval being used.

If the first type of control (described hereinabove referring to FIG. 4) is selected, then the control of communication channel access or release by the calling terminal adapter unit AS is executed as shown in the flow charts of FIG. 7 or FIG. 8. FIG. 7 illustrates the case in which the limit time interval is a fixed interval, while FIG. 8 illustrates the case in which the limit time interval is varied in accordance with the distance between the two data terminals which are to communicate via the ISDN. Referring first to the case of FIG. 7, the calling control section 16 of the calling terminal adapter unit AS reads out the limit time interval value (designated as t) from the auxiliary memory 17 (step S100). In the next step, a decision is made as to whether or not the limit time interval t (measured in units of minutes) has elapsed, i.e. operation waits until that time has elapsed (step S101) When that limit time interval t is found to have elapsed then operation advances to step S102 in which a decision is made as to whether or not the connection to the ISDN line is still established. If the data terminals are found to be properly connected to the ISDN line, (i.e. a "yes" decision in step S102) then step S103 is executed, in which a time point value y which was used in a preceding comparison operation of step 105 (described hereinafter) is read out from a location Z of the memory 14, and is written into a location Y of the memory 14. Step S104 is then executed, in which information representing the most recent time point at which data transfer over the system bus 12 of the calling terminal adapter unit AS occurred is read out, as a value z, from the aforementioned location X of the memory 14, and is then written into the location Z of the memory 14. Next, in step S105, the values y and z are compared, and if these values are found to coincide, then this indicates that the flow of communication data through the system containing the calling terminal adapter unit AS has been halted for a length of time which exceeds the limit time interval t. Hence in that case, a step S106 is executed in which a "line disconnection" message is sent from the line interface section 10 of the calling terminal adapter unit AS through the line terminating unit 3 to the line 2 of the ISDN, and hence to the called data terminal TR. In response, the called data terminal TR interrupts the ISDN line connection between the two data terminals. The calling control section 16 of the calling terminal adapter unit AS then interrupts the virtual communication line between the two data terminals, by sending a "communication channel release" message from the data terminal interface section 11 through the gateway unit 4 to the calling data terminal TS, so that the connection between the terminal TS and adapter unit AS is broken (step S107).

Referring now to the flow chart of FIG. 8, this illustrates the second type of control, for the case in which the second limit time interval is made a variable interval whose value is calculated, as described hereinabove, in accordance with a predetermined fixed monitoring cost amount and the cost per unit time of communication through the ISDN, with that cost per unit time being predetermined based on the distance between the two data terminals which are to communicate. Thus, the flow chart of FIG. 8 differs from that of FIG. 7 described above with regard to the steps S200, S201 and S202, which replace the step S100 of FIG. 7. In steps S200 and S201 information concerning the aforementioned fixed monitoring cost amount, information for obtaining the cost per unit time based on the distance to the opposite terminal, and the value of that distance, are read out from the auxiliary memory 17 of the calling terminal adapter unit AS. A calculation is then executed in step S202, using the information obtained in steps S200, S201, to obtain the necessary value t for the limit time interval.

The remaining steps S204 to S210 in FIG. 8 respectively correspond to the steps S101 to S107 in FIG. 7 described hereinabove, so that further description will be omitted.

The above operation will be further described referring to FIG. 9, which applies to the first type of control described hereinabove and illustrated in FIG. 4. FIG. 9 is a diagram to illustrate the relationship between elapsed time and changes in the time point information values that are held in the locations X, Y and Z of the memory 14. At the time point A, a first comparison of time point values is executed (i.e. in step S105 of FIG. 7 or step S208 of FIG. 8) following the start of data communication. At that time point A, the memory location Y is in the cleared state, so that the comparison is not valid. Hence, the two time point values that are compared will not be identical, so that the communication line is not interrupted. At the time point B in FIG. 9, a second comparison operation is executed, however again the time point values y and z do not coincide, so that in this case too the ISDN line is not interrupted. At the time point α, data communication ceases. At the succeeding time point C, the time point values y and z are still mutually different, so that the communication line connection is not interrupted. However at the next time point D, the values of y and z are found to be mutually identical, so that the calling terminal adapter unit AS interrupts the ISDN line connection to the called terminal adapter unit AR.

Figure 10A:
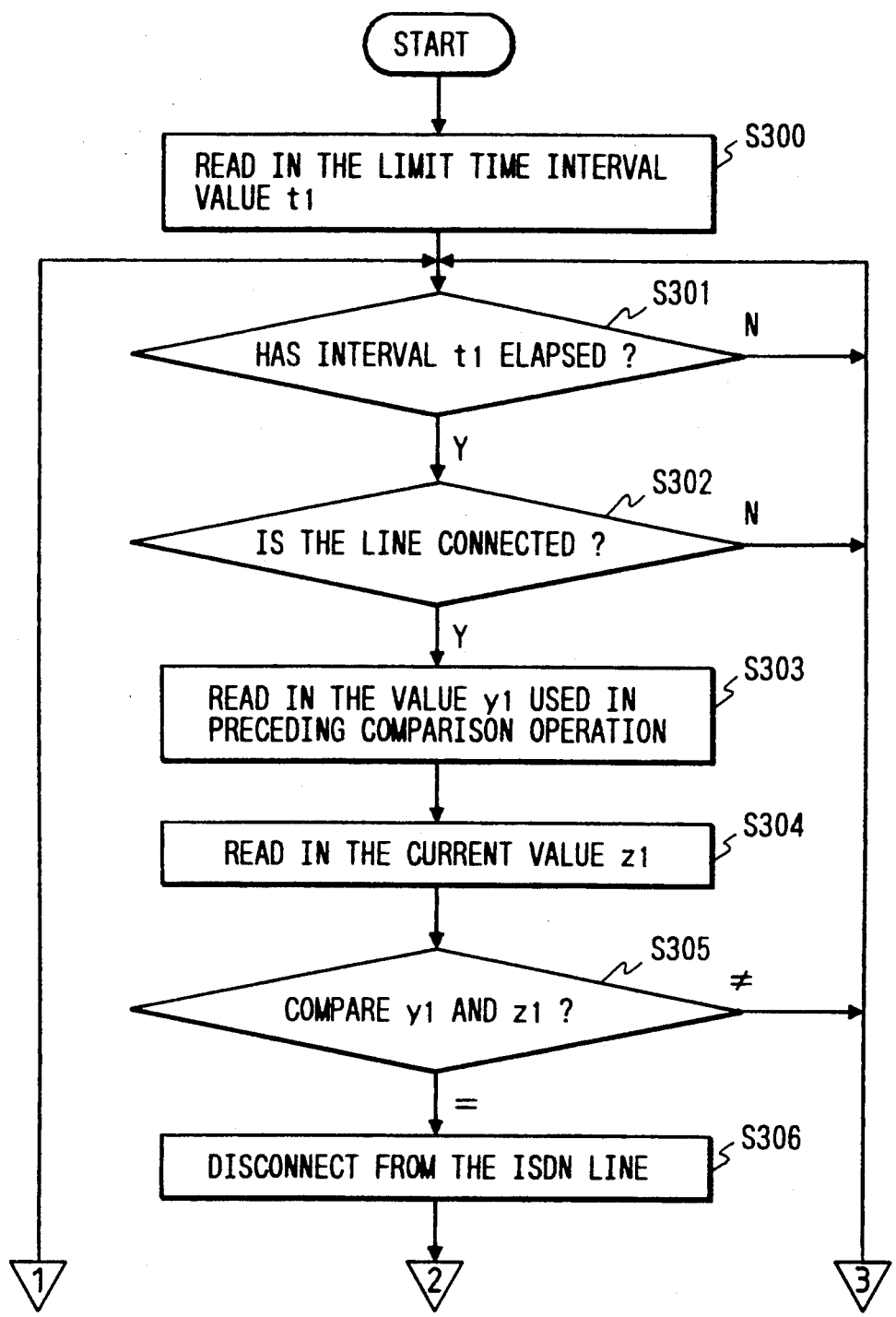
FIGS. 10A, 10B constitute a flow chart for describing the operation of a terminal adapter unit for implementing the second type of communication channel access and release control, with a fixed value of limit time interval being used.
Figure 10B:
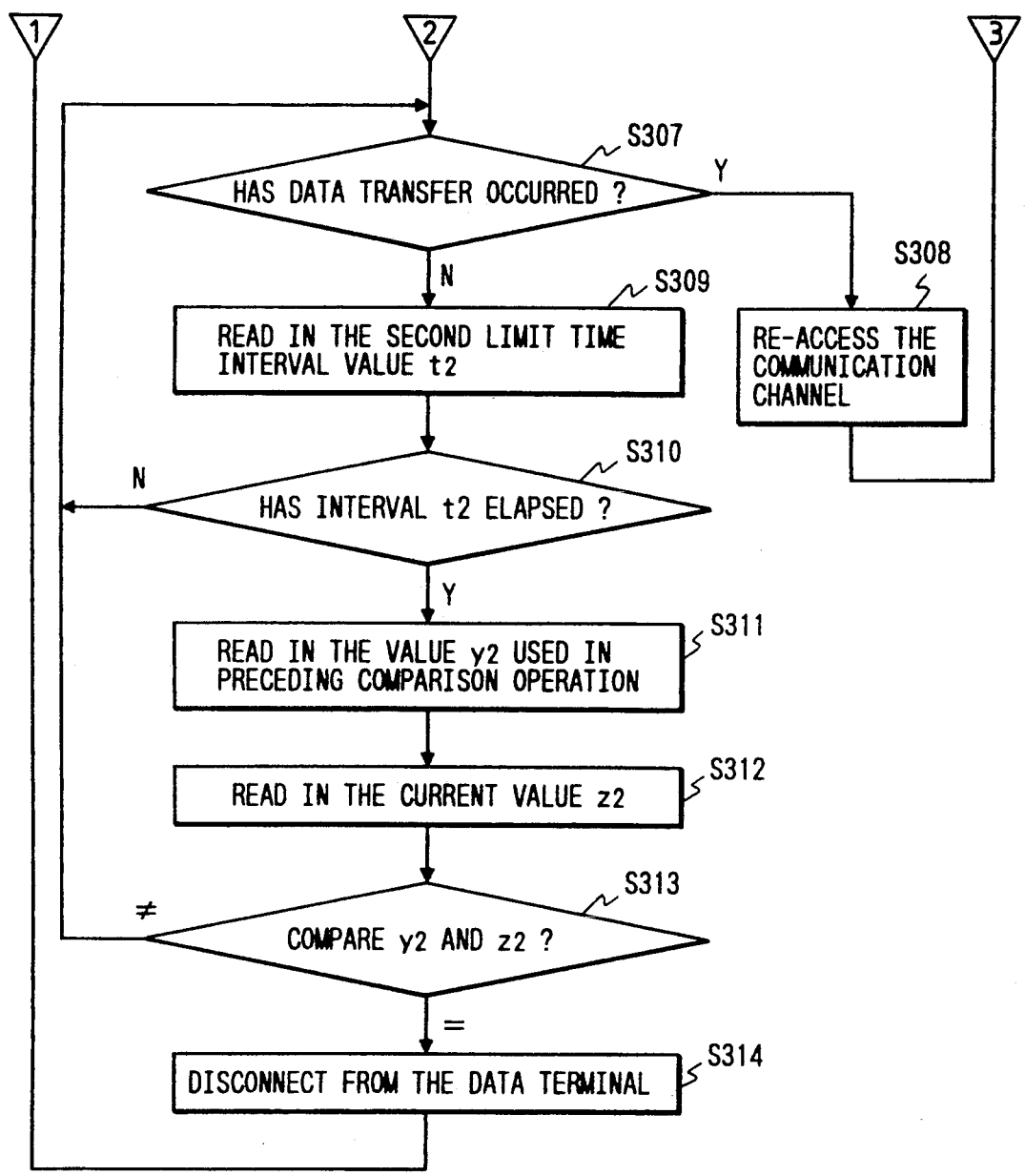
Figure 11A:
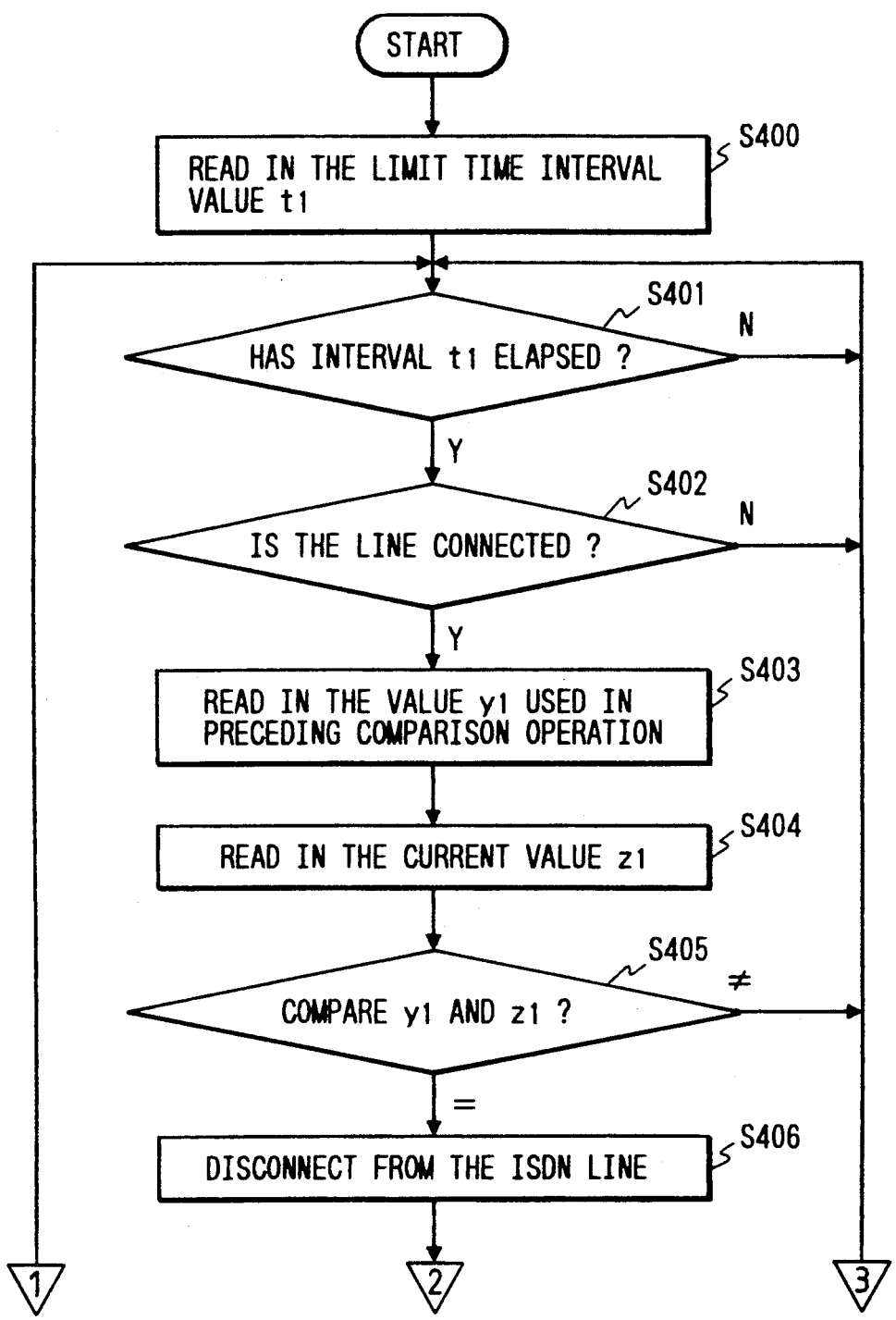
FIGS. 11A and 11B constitute a flow chart for describing the operation of a terminal adapter unit for implementing the second type of communication channel access and release control, with a variable value of limit time interval being used.
Figure 11B:
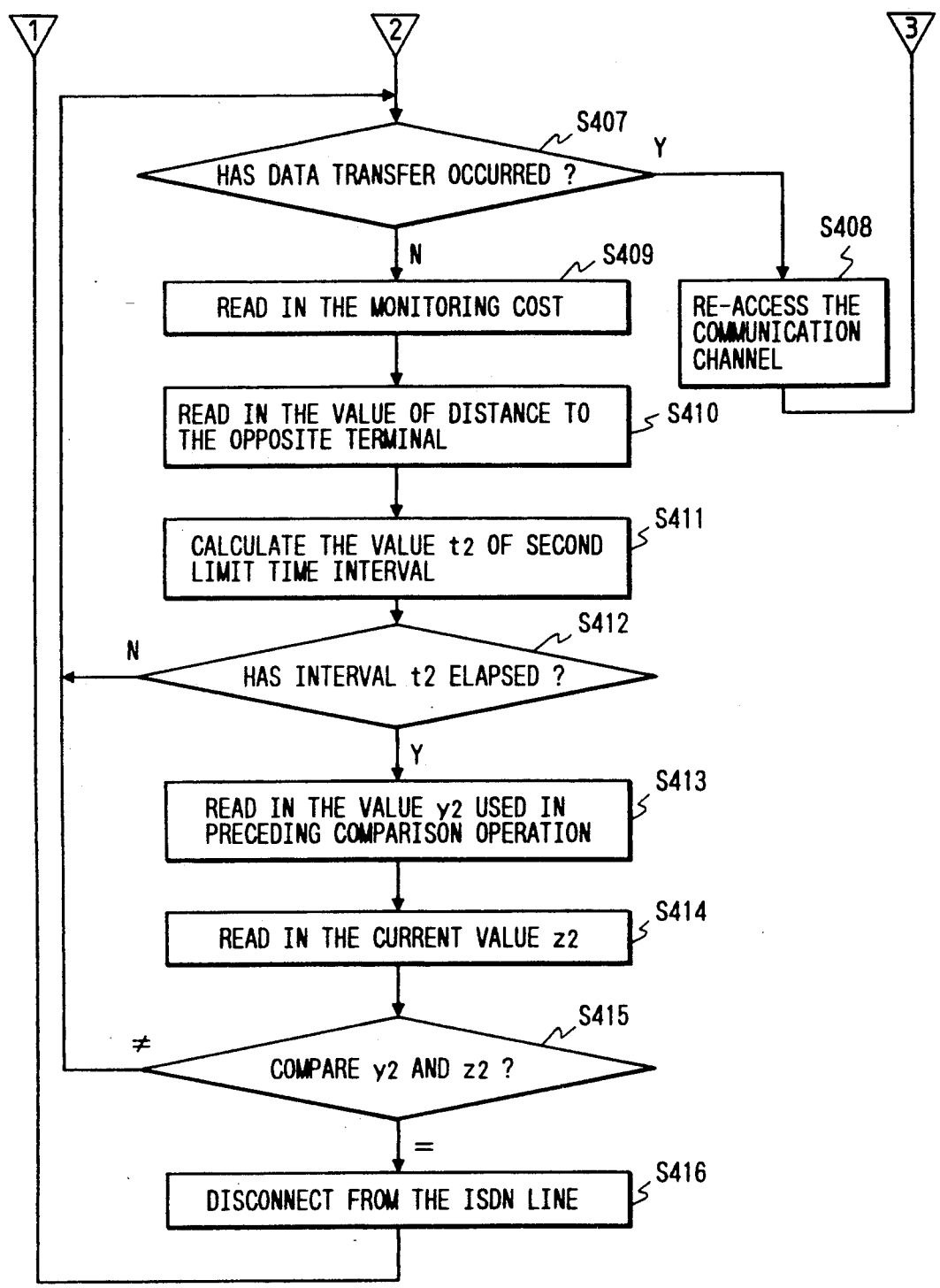

If the second type of control described above (illustrated in FIG. 5) is selected, then the communication channel access and release operations by the calling terminal adapter unit AS will be in accordance with the flow chart of FIGS. 10A, 10B or the flow chart of FIGS. 11A, 11B. In the case of the flow chart of FIGS. 10A, 10B, the second limit time interval is a fixed interval, while in the case of the flow chart of FIGS. 11A, 11B the second limit time interval is calculated as a variable value which varies in accordance with the distance between the calling and called data terminals, as described hereinabove.

Referring first to the flow chart of FIGS. 10A, 10B, the calling control section 16 of the terminal adapter unit 5 of the calling terminal adapter unit AS reads in information representing the first limit time interval (designated as a value $t_1$ in the following) from the auxiliary memory 17 (step S300). The operation then waits until the limit time interval $t_1$ has elapsed, and when that occurs, a decision is made as to whether or not the physical line of the ISDN is connected between the data terminals (step 302). If the line is actually connected, then a time point value $y_1$ which was used in the preceding execution of a step S305 (described hereinafter) is read out from the location Z of the memory 14, and is then written into the location Y of the memory 14 (step S303). The time point value $z_1$ at which the most recent transfer of communication data occurred is read out from the location X of the memory 14, and is written into the location Z (step S304).

The values $y_1$ and $z_1$ are then compared (step S305), and if the values are found to coincide (indicating that a condition in which communication data have ceased to flow on the system bus 12 has continued for a longer time interval than $t_1$) then a "line disconnect" message is sent from the line interface section 10 of the terminal adapter unit 5 of the calling terminal adapter unit AS, through the line terminating unit 3 and the line 2 of the ISDN to the called terminal adapter unit AR. As a result, the ISDN line between the two data terminals is interrupted (step S306). However at this time, no message is sent to the data terminals TS and TR to indicate that the ISDN line has been disconnected. Thus, the virtual communication channel (as described hereinabove) between the two data terminals is maintained, although the physical line through the ISDN 1 is disconnected.

When the physical line has been disconnected in this way, the calling control section 16 thereafter monitors the system bus 12 to determine whether communication data have started to be transferred onto the system bus 12 (step S307). If it is found that data are being transferred, then the calling control section 16 sends a "line access" message to the called terminal adapter unit AR, so that accessing occurs, i.e. the line 2 of the ISDN 1 becomes once more connected between the two data terminals that are to communicate (step S308). The control operation thereby returns to a condition of data sending and receiving between the two data terminals (step S301).

However if it is judged in step S307 that communication data are not being transferred over the system bus 12, then the condition of interruption of the physical ISDN line between the two data terminals is continued, and the second limit time interval value ($t_2$) is read in from the auxiliary memory 17 (step S309). Thereafter, operation waits until the second limit time interval is exceeded (i.e. by sequential loop repetition of the steps S307, S309, S310 as shown in FIG. 10B). If the sending terminal adapter detects that data are again being transferred to the bus 12, before the second limit interval is exceeded, i.e. if a "yes" decision is reached in step S307, then step S308 is executed in which the sending terminal adapter AS re-establishes connection to the opposite terminal through the ISDN (by sending a "line access" message to the called terminal adapter AR). Data transfer is then resumed.

However if the second limit time interval is exceeded before data transfer on the system bus 12 is found to have resumed (i.e. before a "yes" decision is reached in step S307), then the time point value $y_2$ is read out from the location Y of the memory 14 (step S311), then in step 312 the time point value $z_2$ is read out from the location X of the memory 14 These two values $y_2$ and $z_2$ are then compared (step S313), and if they are found to coincide (indicating that the time that has elapsed since the cessation of data transfer between the data terminals exceeds the second limit time interval), an "access release" message is sent by the calling terminal adapter unit AS to the calling data terminal TS, causing the calling data terminal to be released, i.e. causing the virtual communication line to be disconnected (step S314).

At the called data terminal, the calling control section 16 of the terminal adapter unit 5 of that data terminal executes the same type of time monitoring operations described above. If, following reception of a "line disconnect" message sent from the calling system a "line access" message is not received from the calling system before the second limit time interval $t_2$ has elapsed, the called terminal adapter unit AR sends a "communication release" message to the called data terminal TR, so that the virtual communication channel is interrupted at the called end as well as at the calling end of the communication path.

From the above description, it can be understood that the present invention is extremely effective in reducing line utilization costs for users of a wide-area network system based on an ISDN, since the invention serves to substantially eliminate time intervals in which a calling user is accessing a line of the ISDN in a condition in which no communication data are actually being transferred between the calling user and the opposite user.

Although specific values for limit time intervals have been given for the embodiments described hereinabove, these are provided only by way of example, and other values could of course be utilized.

What is claimed is:

1. A method of controlling a communication system formed of a wide-area network and a plurality of data terminals respectively connectable to said wide-area network, wherein a data transfer by one of said data terminals via said wide-area network is controlled by operations comprising:
    establishing a first communication circuit between a terminal adapter apparatus and said data terminal, establishing a second communication circuit from said terminal adapter apparatus through said wide-area network, and executing said data transfer via said terminal adapter apparatus and said wide-area network;
    detecting a cessation of said data transfer which continues beyond a specific time limit by using said terminal adapter apparatus and responding to detection of said cessation by breaking said second communication circuit while leaving said first communication circuit unchanged; and
    using said terminal adapter apparatus for detecting whether a transfer of data from said data terminal into said terminal adapter apparatus is subsequently resumed and responding to detection of resumption of said transfer of data by re-establishing said second communication circuit.

2. A method of communication control according to claim 1, wherein said terminal adapter apparatus is selectively connectable to a plurality of local data terminals and including the step of selectively connecting said terminal adapter apparatus to at least one of said local data terminals.

3. A method of communication control according to claim 1, wherein said terminal adapter apparatus responds to detection that said cessation of data transfer has exceeded said time limit by executing breaking of said second communication circuit without notification to said data terminal of said breaking.

4. A method of communication control according to claim 1, comprising the step of fixedly setting said time limit to a predetermined time interval.

5. A method of communication control according to claim 1, wherein said time limit is a variable time interval and comprising the step of calculating a value of said time limit in accordance with a distance between said data terminal and a data terminal connected at an opposite end of said second communication circuit.

6. A method of controlling a communication system formed of a wide-area network and a plurality of data terminals respectively connectable to said wide-area network, wherein a data transfer by one of said data terminals via said wide-area network is controlled by operations comprising:
    establishing a first communication circuit between said data terminal and a terminal adapter apparatus, establishing a second communication circuit from said terminal adapter apparatus through said wide-area network and executing said data transfer via said terminal adapter apparatus and said wide-area network;
    detecting a cessation of said data transfer by using said terminal adapter apparatus to monitor said data transfer;
    detecting a condition in which said cessation of data transfer continues beyond a first time limit, and responding to said condition by breaking said second communication circuit while leaving said first communication circuit unchanged; and
    using said terminal adapter apparatus to detect whether said cessation of data transfer continues for a duration exceeding a second time limit which is longer than said first time limit, and responding to detection of continuation of said cessation in excess of said second time limit by breaking said first communication circuit.

7. A method of communication control according to claim 6, further comprising the stp of fixedly setting each of said first and second time limit to first and second predetermined time intervals.

8. A method of communication control according to claim 6, wherein at least one of said first and second time limits is a variable time interval.

9. A method of communication control according to claim 8, wherein said second time limit is a variable time interval and comprising the step of calculating said second time limiting accordance with a distance between said data terminal and a data terminal connected at an opposite end of said second communication circuit.

10. A method of communication control according to claim 6, and further comprising:
    using said terminal adapter apparatus to detect a resumption of a data flow from said data terminal, and
    re-establishing said second communication circuit through said wide-area network if said resumption is detected prior to expiration of said second time limit.

11. A method of control of a communication system formed of a wide-area network and a plurality of data terminals respectively connectable to said wide-area network, for controlling data communication between a first and a second one of said data terminals via said wide-area network, comprising:
    establishing a communication circuit between said first and second data terminals through said wide-area network;
    setting a value for a time limit in accordance with a distance between said first ad second data terminals;
    monitoring a data transfer between said first and second data terminals via said communication circuit to detect an interruption of said data transfer; and
    breaking said communication circuit to fit is detected that said interruption persists for a duration exceeding said time limit.

12. A method of control of a communication system formed of a wide-area network and a plurality of data terminals respectively connectable to said wide-area network, for controlling data communication between a first and sa second one of said data terminals via said wide-area network, comprising:
    establishing a first communication circuit between a first terminal adapter apparatus and said first data terminal, a second communication circuit between said first terminal adapter apparatus and a second terminal adapter apparatus through said wide-area network, and a third communication circuit between said second terminal adapter apparatus and said second data terminal;
    detecting interruptions of data transfer between said first and second data terminals via said wide-area network, by using said terminal adapter apparatuses to monitor said data transfer;
    detecting a condition in which said data transfer is interrupted for a duration which exceeds a specific time limit and responding to said condition by breaking sad second communication circuit while leaving said first and third communication circuits unchanged; and
    using said terminal adapter apparatuses for detecting a subsequent resumption of said data transfer and responding to detection of said subsequent resumption by re-establishing said second communication circuit.

13. At terminal adapter apparatus adapted for connection between a data terminal and a wide-area network, comprising:

first interface means controllable for transferring data between said data terminal and said terminal adapter apparatus under a condition in which a first communication circuit tis established between said data terminal nd said terminal adapter apparatus;
second interface means controllable for transferring said data between said terminal adapter apparatus and said wide-area network under a condition in which a second communication circuit is established through said wide-area network from said terminal adapter apparatus;
monitoring mean for monitoring a flow of said data; and
control means responsive to detection by said monitoring means that said flow of data has been interrupted for a time exceeded a time limit,
said control mean responsive to said detection by said monitoring mean by controlling said first and second interface means to break said second communication circuit while leaving said first communication circuit unchanged,
said control means re-establishing said second communication circuit responsive to subsequent detection by said monitoring means that a flow of data from said data terminal has been resumed.

14. A terminal adapter apparatus adapted for connection between a data terminal and a wide-area network, comprising:
    first interface means controllable for transferring data between said data terminal and said terminal adapter apparatus under a condition in which a fist communication circuit is established between said data terminal and said terminal adapter apparatus;
    second interface means controllable for transferring data between said terminal adapter apparatus and said wide-area network under a condition in which a second communication circuit is established through said wide-area network from said terminal adapter apparatus;
    monitoring means for monitoring a flow of data through said first and second interface means; and
    control means responsive to detection by said monitoring means that said flow of data has been interrupted for a time exceeding a specific time limit,
    said control means responsive to said detection by said monitoring means by controlling said first and second interface means to break said second communication circuit while leaving said first communication circuit unchanged,
    said control means re-establishing said second communication circuit responsive to subsequent detection by said monitoring means that a flow of data from said data terminal has been resumed, unless a second time limit has been exceeded which is longer than said first time limit.

15. A terminal adapter apparatus according to claim 14 wherein, when said flow of data is interrupted of a time which exceeds said second time limit, said control means further functions for controlling said first interface means to break said first communication circuit, an for sending to said data terminal a message notifying that said first communication circuit has been broken.

* * * * *